United States Patent
Seelig

[19]

[11] Patent Number: 6,005,304
[45] Date of Patent: Dec. 21, 1999

[54] ARRANGEMENT FOR CONTACTLESS INDUCTIVE TRANSMISSION OF ELECTRICAL POWER

[75] Inventor: Anton Seelig, Floersheim, Germany

[73] Assignee: Daimler-Benz Aktiengesellschaft, Stuttgart, Germany

[21] Appl. No.: 08/860,413

[22] PCT Filed: Dec. 21, 1995

[86] PCT No.: PCT/EP95/05082

§ 371 Date: Jun. 24, 1997

§ 102(e) Date: Jun. 24, 1997

[87] PCT Pub. No.: WO96/20526

PCT Pub. Date: Jul. 4, 1996

[30] Foreign Application Priority Data

Dec. 24, 1994 [DE] Germany .............................. 44 46 779

[51] Int. Cl.[6] ................................................... H04B 5/00
[52] U.S. Cl. ...................... 307/104; 307/17; 340/310.07; 336/DIG. 2
[58] Field of Search ................ 307/104, 17; 340/310.07; 336/DIG. 2, 178

[56] References Cited

U.S. PATENT DOCUMENTS

| | | |
|---|---|---|
| 4,833,337 | 5/1989 | Kelley et al. . |
| 5,293,308 | 3/1994 | Boys et al. . |
| 5,301,096 | 4/1994 | Klontz et al. . |
| 5,519,262 | 5/1996 | Wood .......................................... 307/104 |
| 5,814,900 | 9/1998 | Esser et al. ................................ 307/104 |
| 5,821,632 | 10/1998 | Normann et al. .................. 340/310.07 |
| 5,821,638 | 10/1998 | Boys et al. ................................ 307/104 |

FOREIGN PATENT DOCUMENTS

| | | |
|---|---|---|
| 03107341 | 7/1991 | Japan . |
| 5207605 | 8/1993 | Japan . |
| 5336605 | 12/1993 | Japan . |
| 659426 | 4/1979 | U.S.S.R. . |

Primary Examiner—Albert W. Paladini
Attorney, Agent, or Firm—Venable; George H. Spencer; Catherine M. Voorhees

[57] ABSTRACT

A device for the contactless inductive transmission of electric energy to a movable consumer has a stationary primary circuit designed as an arrangement of elongated parallel leads connected to a source of high frequency alternating voltage or current and a transmission head arranged on the movable consumer. The transmission head consists of a ferrite core and of a secondary winding that surrounds the ferrite core and is magnetically coupled to the primary circuit. The primary circuit lead arrangement has an outer lead designed as an almost closed housing (7) and a middle lead (6) arranged approximately at the center of the housing. The current (11) that flows in the outer lead has the same intensity but an opposite flow direction to the current in the middle lead. The middle lead (6) is surrounded by a U-shaped ferrite core (2) that carries the secondary winding ($W_2$). In order to transmit electric energy independently and at the same time to several movable consumers, a constant medium frequency current ($J_1$) flows through the transmission device. The current is kept constant in that the transmission arrangement is connected in parallel to a capacitor ($C_E$) connected in series to an inductor ($L_E$) and to a medium frequency voltage source (MFG1). A resonance is created between the inductor ($L_E$) and the capacitor ($C_E$) at the frequency (fo) of the medium frequency voltage source (MFG1).

20 Claims, 7 Drawing Sheets

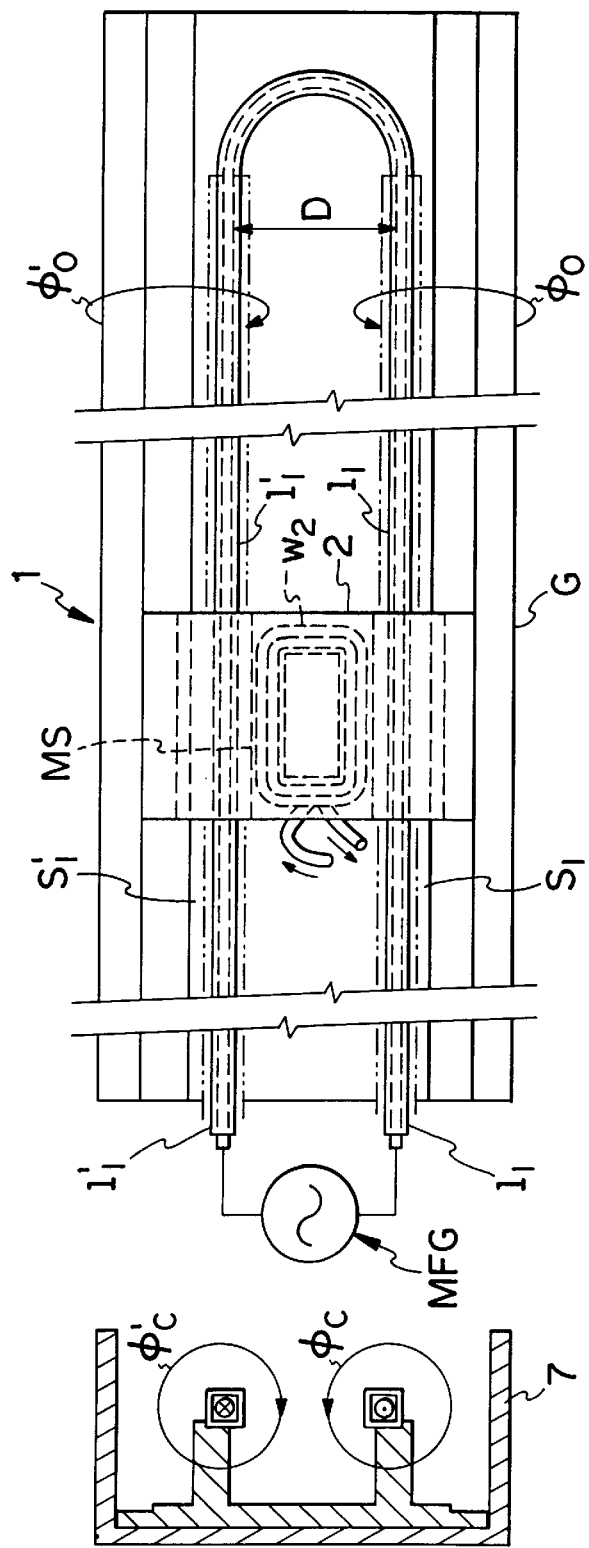
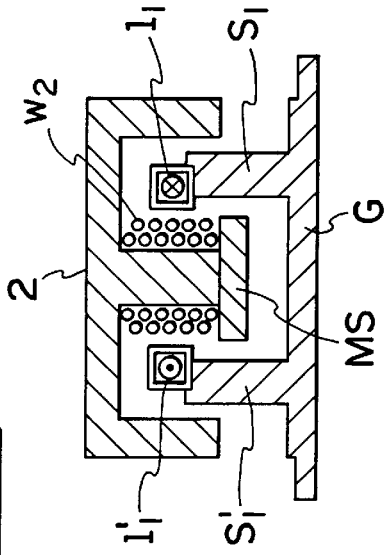
FIG. 1A (Prior Art)
FIG. 1B (Prior Art)
FIG. 2 (Prior Art)

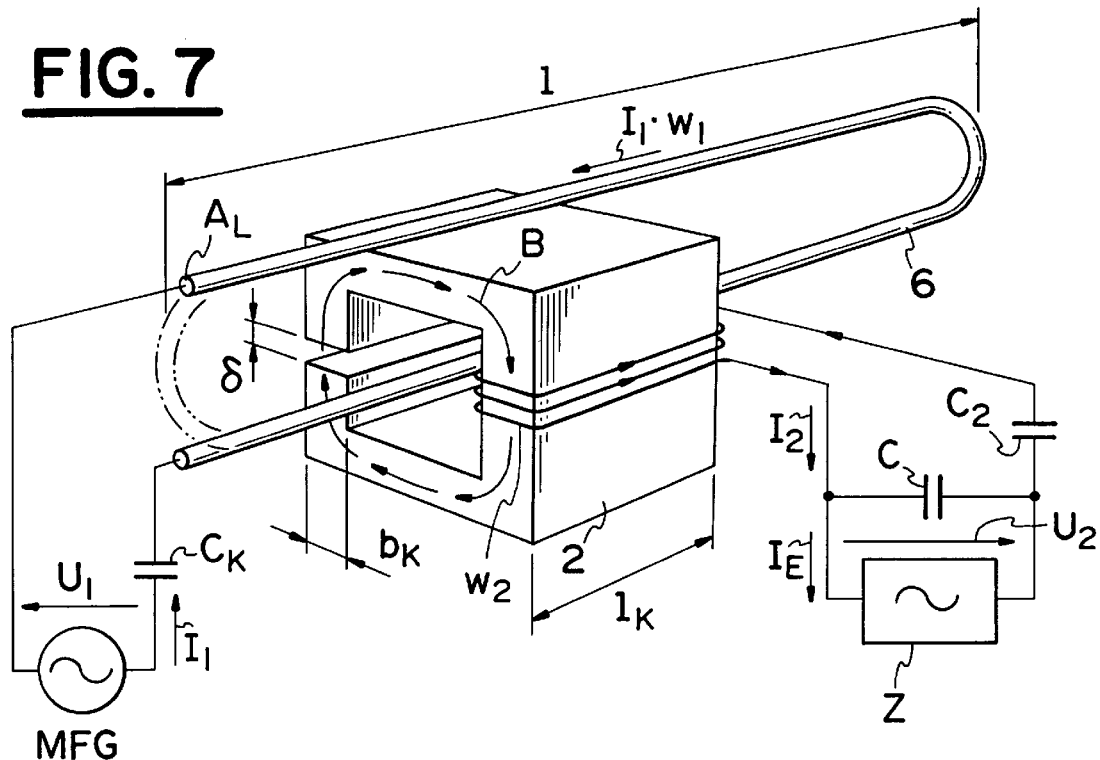
FIG. 7
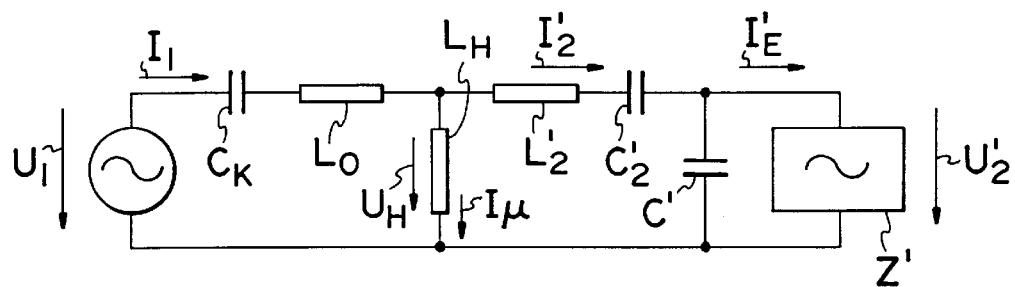
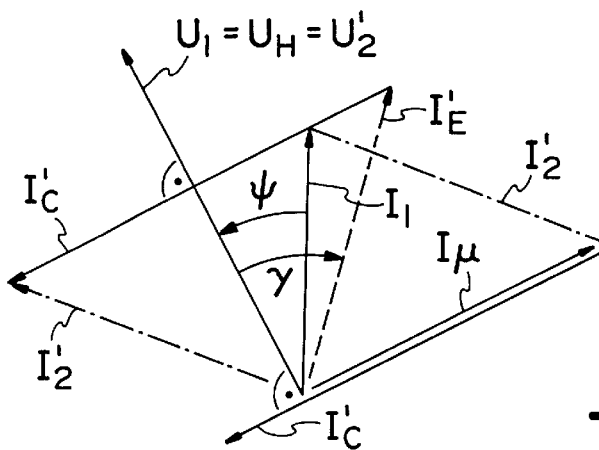
FIG. 8
FIG. 9

ARRANGEMENT FOR CONTACTLESS INDUCTIVE TRANSMISSION OF ELECTRICAL POWER

BACKGROUND OF THE INVENTION

The invention relates to an arrangement for contactless inductive transmission of electrical power.

An arrangement of this type is known from the application WO 92/17929 A1. This application describes an inductive energy-distribution system that inductively transmits electrical energy to one or a plurality of movable consumers via a double line.

Ferrite bodies 2 are moved between these double lines $l_1$ and $l_1'$ (FIG. 1B); these bodies support a secondary winding $w_2$ that supplies the energy to drives and consumers on the moved systems. The ferrite bodies having the secondary windings are referred to hereinafter as transmitter heads. The conductors $l_1$ and $l_1'$ of the double line (FIGS. 1B and 2) are secured to conductor supports S1 and S1' comprising magnetically and electrically non-conducting material. The double line is surrounded by an E-shaped ferrite core 2, whose center leg MS projects deep into the space between the conductors and supports the secondary winding $w_2$, by way of which energy is tapped and supplied to the moved consumer. The inductive energy-transfer arrangement known from this publication comprises, in the simplest case, a middle-frequency generator, which feeds an elongated conductor loop formed by the conductors $l_1$ and $l_1'$ with a high-frequency current; the two conductors form a double line.

FIGS. 1B and 2 show this type of double line of the related art, with a plan and cross-sectional view of a movable transmitter head 1 comprising an E-shaped ferrite core 2 having the secondary winding $w_2$ on its center leg MS. A relatively high frequency, at least 10 kHz, is required to keep the transmitter head or heads as small as possible.

Arrangements having elongated conductors are referred to as line conductor or line pole systems, because the magnetic alternating flux extending transversely to the direction of movement is always directed uniformly along the conductor, and thus forms linear poles. In double lines, the moved transmitter head comprises at most an E-shaped ferrite core that surrounds the two stator conductors and conducts the magnetic flux through the secondary winding.

Energy transmissions of this type have numerous applications in areas in which conventional loop lines or trailing cables are advantageously replaced. For example, a transmission with loop contacts is associated with spark formation, wear and noise. Significant applications for contactless transmission of electrical energy are in the traveling cranes of hoists, high-lift storage or magnetic paths. This type of system would also be advantageous for energy transmission into elevator cars. Robots that must travel a specific path to work at different locations can likewise be supplied with energy by such a system.

In an arrangement according to FIGS. 1A and 1B, the middle-frequency generator MFG feeds the current I, at a frequency above 10 kHz, into the conductor loop formed by $l_1$ and $l_1'$. This conductor loop generates scatter fields, which are indicated by $\Phi_c$ and $\Phi_c'$ in FIG. 1.

Moreover, the double line comprising $l_1$ and $l_1'$ is covered by an aluminum housing 7 in the front part of the conductor loop. Covers are basically necessary to prevent further propagation of the scatter field $\Phi_c$, because it causes disturbances in adjacent signal-current circuits, for example, and influences the electromagnetic compatibility. With high powers, the danger of harm to human health may arise.

In the rear part of FIG. 1B, the indicated scatter fluxes $\Phi_O$ and $\Phi_O'$ indicate that the field scatters significantly further into the surroundings without a cover housing.

The greatest disadvantage of this arrangement is the high inductance of the double line comprising the conductors $l_1$, $l_1'$. In addition to the unhindered propagation of the scatter fields in unshielded double lines, the relatively large spacing D between the conductors $l_1$ and $l_1'$ is the primary cause of the high inductance. This spacing D must, however, have a minimum value so that the center leg MS of the E-core supporting the secondary winding $w_2$ can be guided between the conductors $l_1$ and $l_1'$. The space requirement of the center leg and the secondary winding, and thus the spacing D, is determined by the power to be transmitted.

At the high transmission frequencies, the power inductances cause high inductive voltage drops that must be compensated through a large outlay for capacitors.

Elektrie 34, 1980, Volume 7, discloses an arrangement for inductive energy transmission to hauling locomotives. This arrangement employs double lines laid on the roof of a mine tunnel. Ferrite bodies 2 that support a secondary winding $w_2$ move between these double lines $l_1$, $l_1'$ (FIG. 1B); the winding supplies the energy to drives and consumers on the moved systems. The ferrite bodies with the secondary windings are referred to hereinafter as transmitter heads.

The above publication describes methods of compensating the inductive voltage drop on the lines and at the scatter inductances of the transmitter heads through capacitors switched in series with the double line and the secondary windings. The energy can be transmitted to at least two movable consumers by way of the same double line.

The inductance of the double lines has a decisive effect on the possible length of the travel path of the moved systems. For many applications, the arrangement is very costly, because it requires an additional cover housing 7 along with the double line. To prevent loss of current, the conductors $l_1$ and $l_1'$ of the double line must comprise a high-frequency litz produced from individually-insulated conductors, which is standard in high-frequency technology.

SUMMARY OF THE INVENTION

It is the object of the invention to realize a low power inductance, even with a considerably long line, in an arrangement for contactless transmission of electrical power.

In accordance with the invention, this object is accomplished in an arrangement for contactless transmission of electrical power to a movable consumer having a dormant primary circuit configured as an elongated, parallel arrangement of conductors that is connected to a high-frequency AC voltage source or alternating current source and a transmitter head that is attached to the moveable consumer and includes a ferrite core and a secondary winding surrounding the ferrite core and magnetically coupled to the primary circuit wherein the conductor arrangement of the primary circuit has an outside conductor configured as a nearly-closed housing and a center conductor located approximately in the center of the housing where the center conductor is surrounded by a U-shaped ferrite core that supports a secondary winding. The current flowing in the outside conductor is of an equal magnitude and flowing in a direction opposite to that of the current flowing in the center conductor. Modifications of the invention are described below and the Detailed Description.

The invention involves inductive energy transmission, at middle frequency, to transport elements moved in translatory fashion in conveying technology, and to mobile work platforms.

The simultaneous, independent transmission of electrical power to a plurality of transport elements on long transmission paths with individual powers up to the 10-kW range is a significant characteristic of these applications. For this purpose, transmitter arrangements are necessary that transmit the power via air gaps up to the cm range for justifiable costs and with good effectiveness, have the smallest possible inductive voltage drops on the transmission paths, and in which scattering magnetic fields are harmless with respect to human exposure and electromagnetic compatibility. These properties are essentially attained by the geometrical configuration of the inductive transmitter elements.

The crucial feature of the invention lies in the "coaxial" arrangement of the conductors. The center conductor is connected to the U-shaped outside conductor at the end of the travel path, so the current flows back from the center conductor by way of the outside walls. The current is distributed over two outside walls. Despite the low penetration depth, the current is able to make use of a large cross section. The coaxial arrangement ensures, on the one hand, the smallest possible inductance of the power, so that larger transmission lengths are possible, and, at the same time, effects the shielding of the arrangement against scattering fields. The scatter field $\Phi_O$ essentially lies only within the coaxial conductor, specifically inside and around the center conductor.

The combination of the cover housing 7 with the return line results in the additional advantage of saving conductor material. Moreover, because of the lower inductances, capacitors are not needed to compensate the inductive voltage drops. This accounts for the low inductance.

BRIEF DESCRIPTION OF THE DRAWINGS

The invention is described in detail below with reference to the drawings in which:

FIG. 1B is an arrangement for transmitting energy to movable consumers that are moved in linear fashion over a path, as known from the related art;

FIG. 2 a cross-section through the active parts of the transmission head, as known from the related art;

FIG. 7 is a general representation of the principle of the invention for inductive energy transmission to systems moved in linear fashion;

FIG. 8 an electrical equivalent circuit diagram of the transmitter arrangement according to FIG. 7;

FIG. 9 is a vector diagram of the voltages, currents and phase angles of the equivalent circuit diagram of FIG. 8;

DETAILED DESCRIPTION OF THE INVENTION

The invention is first described in conjunction with the schematic diagram in FIGS. 3 through 6. It represents an arrangement, similar to that of a coaxial conductor, that is open to one side. In the transmitter head 1, a U-shaped ferrite core 2 surrounds the center conductor 6 and conducts the magnetic flux $\Phi$ through the secondary winding $w_2$. A moveable consumer VB is connected to the ferrite core 2 via the secondary winding $w_2$. The center conductor 6 is fed by a middle-frequency generator at one end, so it guides the current $I_1$. It is connected to the housing at the end E removed from the feeder source.

The current is divided into two partial currents $I_1/2$ of equal magnitude due to the symmetry of the arrangement, and flows back to the middle-frequency generator MFG via the housing.

Figure 3:
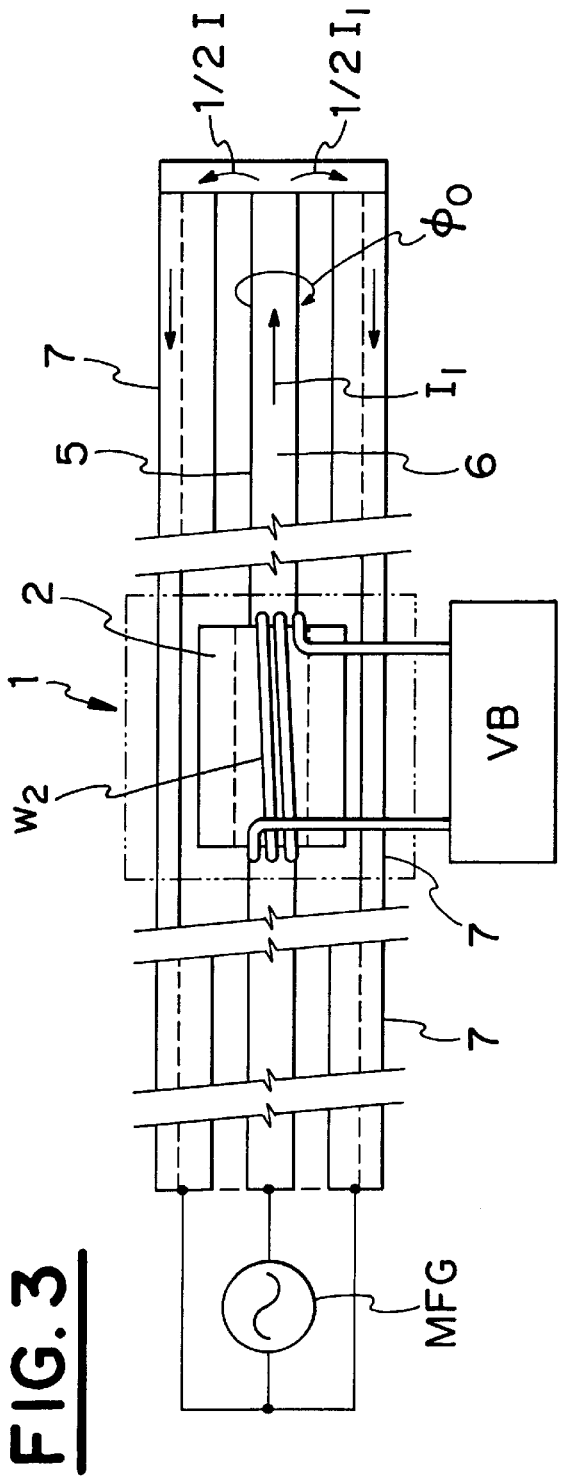
FIG. 3 a plan view and longitudinal section of the arrangement of the open coaxial conductor according to the invention.
Figure 5:
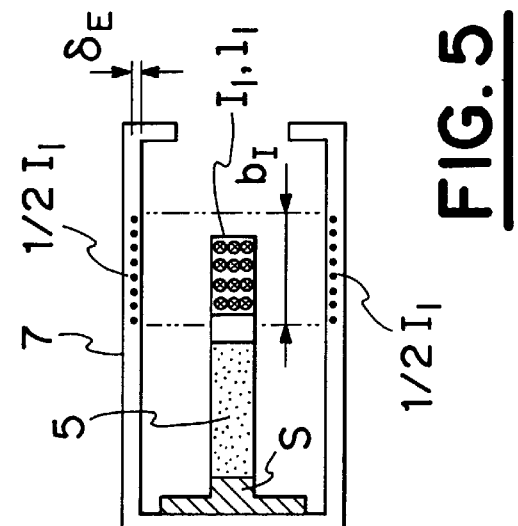
FIG. 5 a cross-section through the coaxial conductor arrangement at a point where no movable consumer is currently located.

Because of the current displacement, also frequently called skin effect, that occurs at high frequencies in solid conductors such as the U-shaped housing (for example comprising aluminum), the current is not distributed evenly in the housing walls, but only penetrates the housing walls corresponding to the penetration depth $\delta E$. In aluminum, the penetration depth at 25 kHz is about 0.5 mm. The current is also not distributed uniformly over the inner circumference of the U profile, but flows predominantly at the locations of highest magnetic field intensities. On the path segments on which no transmitter head is located, as shown in FIG. 5, these locations are the current-guide regions of the expansion $b_I$ located opposite the center conductor 6 and lying closest thereto. Therefore, only a cross-section is available for the return line that results from the current-conducting width $b_I$ and the penetration depth $\delta E$ of the middle-frequency current, which depth is determined by the frequency and the material properties.

The inside or center conductor 6 is advantageously produced from a middle- or high-frequency litz in order to eliminate the current displacement in this region.

Because of the limited penetration depth of the current and the nonuniform distribution of the current density onto the insides of the cover housing, the effective resistance and the losses in the return line or housing 7 can be greater than in the inside conductor 6 comprising a middle-frequency litz.

The shaping of the inside conductor and the return, or outside, conductor, which simultaneously serves as a shield and housing 7, is therefore intended to achieve the widest possible current-guidance region of the width $b_I$ at the inner housing circumference. This is most usefully effected with a shape shown in FIG. 6, namely a narrow inside conductor 6 having the greatest possible height H. In addition, the current-guidance width $b_I$ is increased, and a more uniform current distribution is achieved, with an arching of the outside walls, as shown in dashed lines in FIG. 6.

The dimensions of the entire transmitter arrangement and the current intensity I required for transmitting a specific power are primarily determined by the size of the effective air gap in the magnetic circuit.

Figure 4:
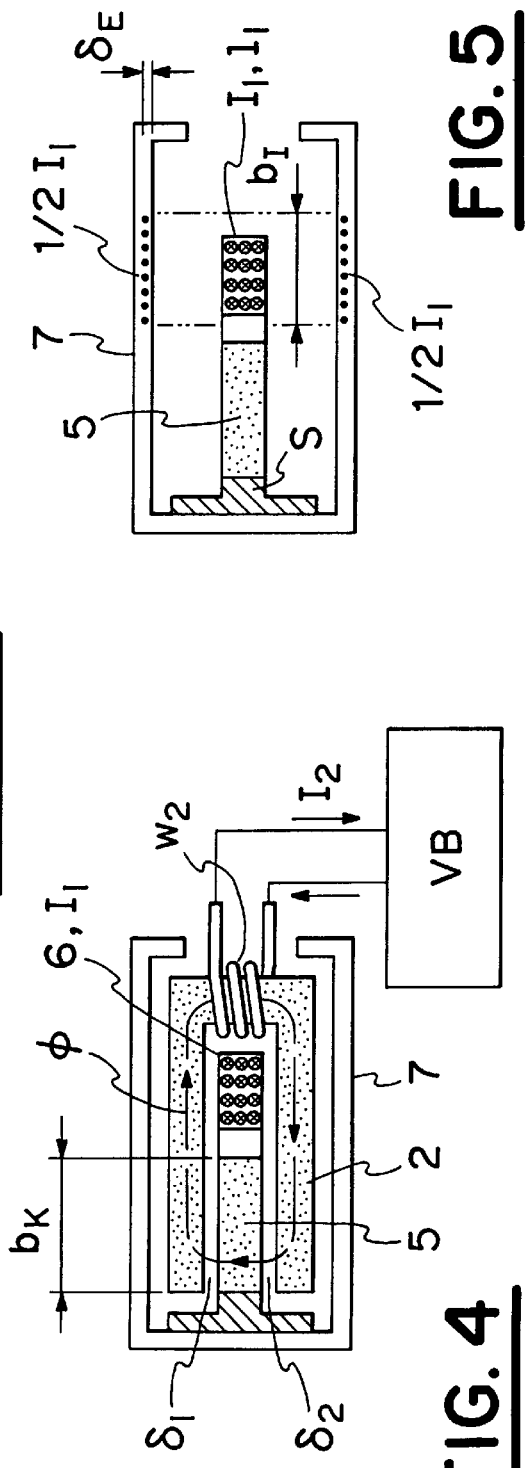
FIG. 4 a cross-section through the coaxial conductor with the transmitter head.

So that the air gap of the magnetic circuit that guides the magnetic flux need not be larger than the mechanical play $\delta_1$ and $\delta_2$ of the transmitter head, ferrite heads 5 can be inserted into the supports S of the center conductor, as shown by way of example in FIGS. 4 and 5. These ferrite parts virtually do not increase the inductance of the center conductor at all, because the current is always established spatially in the side walls according to physical laws such that the inductance is minimal, that is, the current flows predominantly at the side parts opposite the center conductors.

Figure 6:
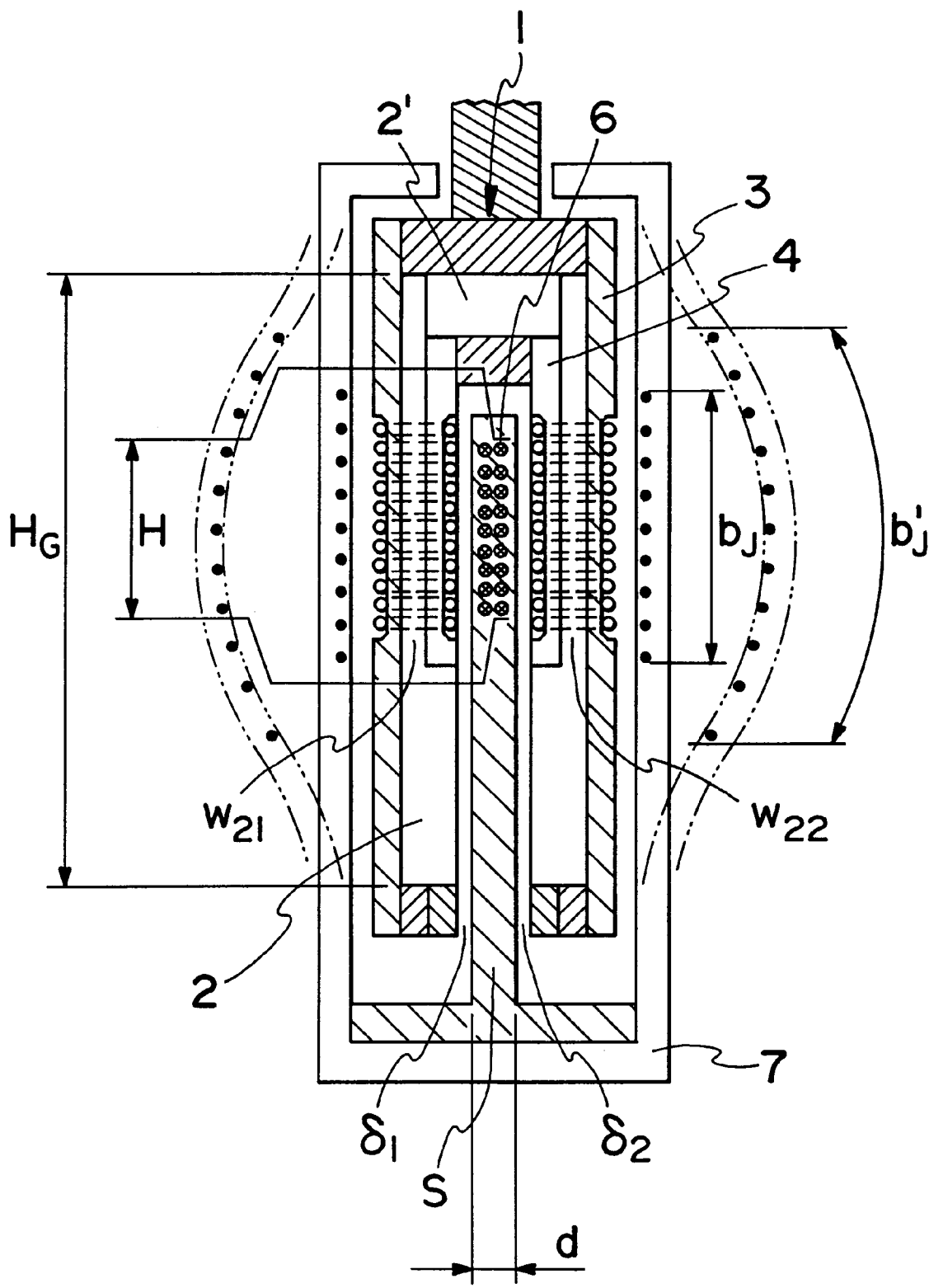
FIG. 6 is a cross-section of a particularly advantageous, detailed embodiment of a coaxial conductor arrangement with the transmitter head.

In the U-shaped ferrite core 2 in FIG. 6, the secondary winding comprises two partial windings $w_{21}$ and $w_{22}$, which are disposed on the two legs of the core, directly opposite the inside conductor that has expanded at the height H. A high magnetic coupling factor to the primary conductor 6 and an optimum utilization of the available winding space with a small design and inductance of the coaxial conductor are achieved with this winding arrangement. As will be explained in detail with reference to FIGS. 7 through 9, a large winding space for the secondary winding is especially important with respect to attaining large gap widths or large transmittable powers, because the magnetization current $I_M$, which attains correspondingly large values with large gap widths, flows in the secondary windings $w_{21}$, $w_{22}$ in the transmitter arrangement of the invention.

The simplified and generalized transmission system in FIG. 7 comprises a primary-side conductor loop having a length 1 and extending through the window of a C-shaped ferrite core 2. It can be displaced randomly along the conductor loop. A secondary winding having the winding number $w_2$ is wound around the ferrite core. The winding is switched in series with a capacitor $C_2$ that is dimensioned such that the voltage at the secondary scatter inductance $L_2$ is compensated at the frequency of the middle-frequency generator MFG.

The primary conductor loop can comprise one or a plurality of windings $w_1$ in which a current $I_1$ flows. Corresponding to the transmitter equivalent circuit diagram in FIG. 8, the current is divided into the magnetization current $I_\mu$ and the secondary-side equivalent current $I_2$.

An arbitrary load Z, for example having a power converter control member that can establish an arbitrary phase angle between the voltage $U_2$ of the base oscillation of the input current $I_E$ is connected to the output of the transmitter. The vector diagram in FIG. 9 shows the currents, voltages and phase angles for a random, assumed operating state. A current $I_E$ or $I_E'$, that is, an ohmic-inductive load impedance Z or Z', lagging behind the output voltage $U_2$ or $U_2'$ by the angle was assumed in the illustration.

The values indicated by ' in the equivalent circuit diagram are, as is generally known for transmitters and transformers, the values converted with the transmission ratio of the winding numbers $w_1/w_2$ to the primary winding number.

Because the transmitter arrangement is operated at a constant frequency, a virtually complete compensation of the inductive voltage drops at the secondary-side scatter inductance $L_2'$ is possible with the capacity $C_2'$ switched in series, and at the inductance $L_0$ of the coaxial conductor arrangement by the capacity $C_K$. Without taking the ohmic voltage drops into consideration, the load voltage $U_2'$, the primary field voltage $U_H$ of the transmitter and the feeder voltage $U_1$ of the arrangement are identical, as shown in the vector diagram of FIG. 9. As FIG. 9 shows, the capacity C' parallel to the load impedance Z' compensates not only the magnetizing current $I_\mu$, but also a portion of the inductive component of the load current $I_E$. A phase angle $\Phi=0$ can be established between the current $I_1$ of the open coaxial conductor and the feeder voltage $U_1$ of the transmitter arrangement through the establishment of the load angle $\gamma$, for example with a power converter, and the dimensioning of the secondary-side capacity C or C'. The open coaxial conductor then transmits pure effective power, although a large magnetization current $I_\mu$ occurs, as dictated by the gap width of the transmitter arrangement, and the inductance $L_0$ of the coaxial conductor attains large values with conductor lengths 1 in the 100 m range. Only the secondary current $I_2'$ in the secondary winding $w_2$, which is significantly shorter corresponding to the length $l_K$ of the transmitter head, is increased by the magnetization current $I_\mu$.

For many applications of contactless energy transmission, such as in conveying technology, transmitter arrangements are required in which a plurality of consumers VB having arbitrarily changeable power requirements can move on the same transmission path. The insertion of a plurality of transmitter heads into the open coaxial conductor of FIG. 3, or into the primary conductor loop 6, which is shown in FIG. 7, leads electrically to a series connection of the movable consumers VB. In an advantageous embodiment of the invention according to FIG. 13, a constant middle-frequency current $I_1$ is impressed into the coaxial conductor. As will be explained below, it is advantageous to use electronic power control members which, on the output side, feed different consumers with the necessary voltages and currents. On the input side, voltages $U_{V1}$, $U_{V2}$ corresponding to the windings of the consumers $VB_1$, $VB_2$ are coupled into the circuit of the impressed, constant current $I_1$ of the coaxial conductor.

Figure 10:
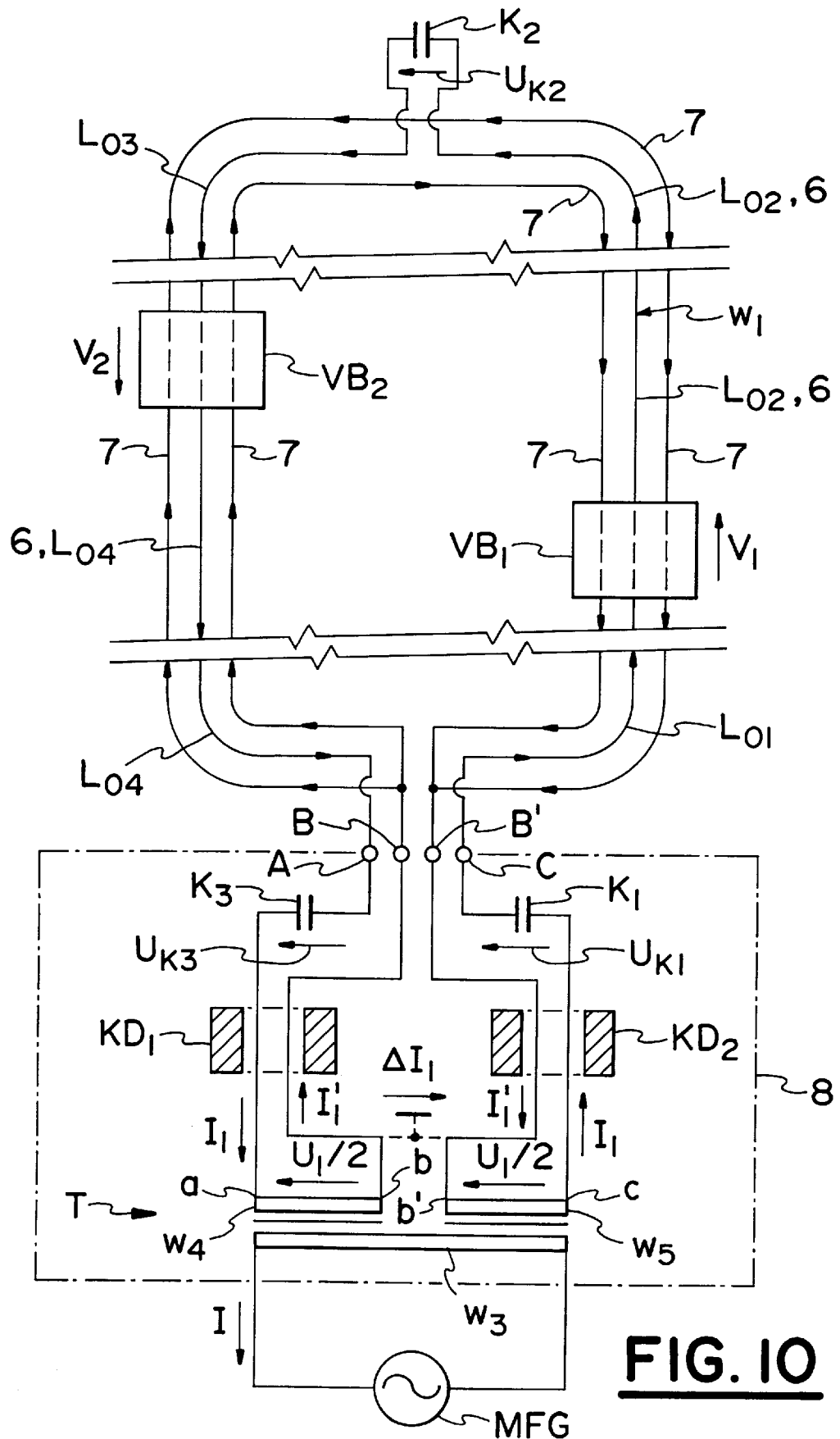
FIG. 10 is a coaxial conductor arrangement having a closed path for the endless movement of a plurality of consumers and a feeder circuit that balances the currents in the inside and outside conductors.

Moreover, closed transmission paths, on which the consumers $VB_1$, and $VB_2$ perform endless movements, are advantageous. As shown in FIG. 10, two ends of the coaxial conductor having a total of four connections A, B, B' and C that are to be connected to a middle-frequency generator MFG meet at a feed-in point. This generator has the property of a middle-frequency constant-current source (FIG. 10), and impresses its current I into the primary winding $w_3$ of a transformer comprising this winding and the secondary windings $w_4$ and $w_5$.

The two secondary windings $w_4$ and $w_5$ have the same winding numbers, and are connected, by their winding ends a, b, b' and c, to the coaxial conductor ends A, B, B' and C via compensation capacitors $K_3$, $K_1$ such that the secondary windings form, with the inside and outside conductors (via the connections a, $w_4$, b, B, outside conductor 7, B', b', $w_5$, c, $K_1$, C, inside conductor 6, A, $K_3$, a) a current circuit, in which the inside and outside conductors are closed in opposite directions by the same current $I_1=I_y$. Furthermore, this current retroacts additively in equal parts on the primary winding $w_3$ of the transformer in the secondary windings $w_4$ and $w_5$, and voltages of the magnitude $U_{K3}-\frac{1}{2} U_1$ and $-(U_{K1}-\frac{1}{2} U_1)$ occur at the connections A, C of the inside conductor, opposite the outside-conductor connections B, B', the voltages being equal in magnitude and opposed in phase position.

In the open coaxial conductor of an endless transmission path according to FIG. 10, the housing 7, i.e., the outside conductor of the open coaxial conductor, forms a neutral center point with the connection points B, B', b, b', with respect to the potential. For reasons of safety with respect to electric shock, and because of the electromagnetic compatibility, it is advantageous to connect this neutral center point to the mass or ground. This occurs most usefully at the feed-in point, as indicated in dashed lines in FIG. 10, and for reasons of symmetry, at the connecting point b–b' of the two identical secondary windings $w_4$ and $w_5$. Because of this connection, however, an additional current circuit in which a balancing current $\Delta I_1$ can flow is formed by the connection points B, B' and the large loop formed by the outside conductor 7. The currents $I_1$ and $I_1'$ become unequal in the inside and outside conductors because of this balancing current, and an additional scatter field that negatively influences the electromagnetic compatibility arises in the region surrounding the coaxial conductor. To avoid this balancing current, that is, to ensure uniformity of the currents $I_1$ and $I_1'$ of the coaxial conductor, the supply lines of these currents are guided by way of compensation throttles $KD_1$ and $KD_2$ such that the current $I_1$ of the inside conductor and the current $I_1'$ of the outside conductor effect an opposing magnetization of the soft magnetic throttle cores having a high magnetic permeability.

The high inductance of these compensation throttles is ineffective at $I_1$ equals $I_1'$ or $\Delta I_1$ equals zero, and limits a possible dissimilarity to negligible values of $\Delta I_1$. The compensation throttles $KD_1$ and $KD_2$ can be embodied simply from ferrite-ring cores pushed by way of the supply lines of the coaxial conductors.

Figures 11, 12:
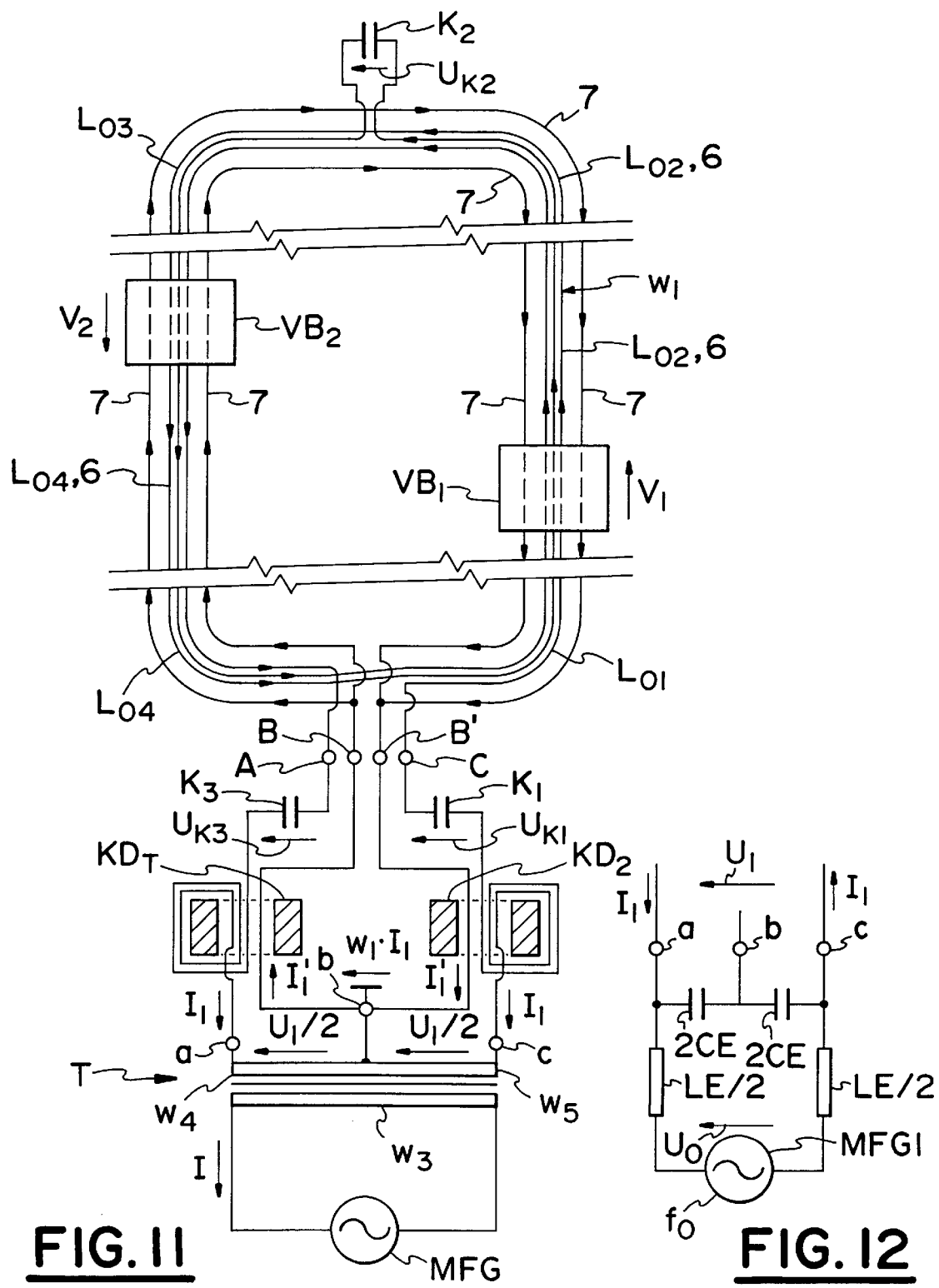
FIG. 11 is a coaxial conductor arrangement corresponding to FIG. 5, having an inside conductor that comprises a plurality of windings and a current-balancing feeder circuit.
FIG. 12 is an embodiment of a current-impressing source for feeding the transmitter arrangements.

The use of the compensation throttles in feeding closed transmitter arrangements having an open coaxial conductor also permits—as shown in FIG. 11—the embodiment of open coaxial conductors having inside conductors that comprise a plurality of windings $w_1$.

It is essential to the function of the coaxial transmission arrangement that, in the walls of the coaxial conductor, the total current $w_1 \cdot I_1$ flow in the opposite direction of $I_1$ in the inside conductor.

The uniformity of the total currents of the inside and outside conductors is achieved in that the connection lines A–a, C–c leading to the transformer T or the middle-frequency current source MGF1 be wound in so many windings around the cores of the compensation throttles $KD_1$, $KD_2$ that a transmission ratio of $w_1$ arises between these windings and the connection lines B–b, B'–b of the outside coaxial conductor wall, which are likewise guided through the cores of the compensation throttles. In the example shown in FIG. 11, the connection lines of the coaxial conductor are only guided once through the cores of the throttles $KD_1$, $KD_2$; the inside conductor connection lines are therefore wound exactly $w_1$ times around the throttle cores. The connecting point b of the outside conductor connection lines is also the point of symmetry of the entire transmitter arrangement here, and is therefore connected to the secondary-side center tap of the transformer and the mass point or "ground."

The transformer T in FIGS. 10 and 11 essentially serves to form the two partial voltages ½ $U_1$ of equal magnitude, and the adaptation of the impedance of the transmitter arrangements to the middle-frequency current source MFG. Middle-frequency current sources of the related art comprise a middle-frequency voltage source, for example a middle-frequency inverted rectifier, and are therefore very costly.

A particularly simple feeder circuit having a current-source behavior based on a middle-frequency voltage source MFG1, for example an inverted rectifier without an expensive current regulation, is illustrated in FIG. 12. In this switching principle, the voltage $U_1$ is divided into partial voltages of equal magnitude through the series connection of two capacitors of equal size that have the capacity $2\ C_E$. The outside connections a, c of this series connection are connected by way of induction coils having the inductance ½ $L_E$ to a middle-frequency voltage source MFG1 having the voltage $U_0$.

It can be proven through calculation that the relationship $$I_1 = U_0 \cdot \sqrt{C_E / L_E}$$

applies for the circuit arrangement in FIG. 12 if $C_E$ and $L_E$ are selected such that they meet the resonance condition at the frequency $f_0$ of the middle-frequency voltage source MFG1.

In this case, a current $I_1$ whose intensity is determined solely by the voltage $U_0$ and the variables $C_E$ and $L_E$ is impressed into the coaxial conductor. The voltage $U_1$ arising at the terminals a, c is exclusively dependent on the magnitude of the current $I_1$ and the impedance of the transmission system connected to the terminals a, b, c and having the consumers $VB_1$ and $VB_2$. As shown in the equivalent circuit diagram of FIG. 13 and the vector diagram of FIG. 14, the voltage $U_1$ is the sum of a plurality of partial voltages. With virtually complete compensation of the transmission system, this voltage is essentially determined by the voltages of the consumers $VB_1$ and $VB_2$. Because of the current-impressing behavior of the feeder circuit comprising MFG1, $L_E$ and $C_E$, the voltage $U_1$ does not retroact on the current $I_1$.

Figures 13, 14:
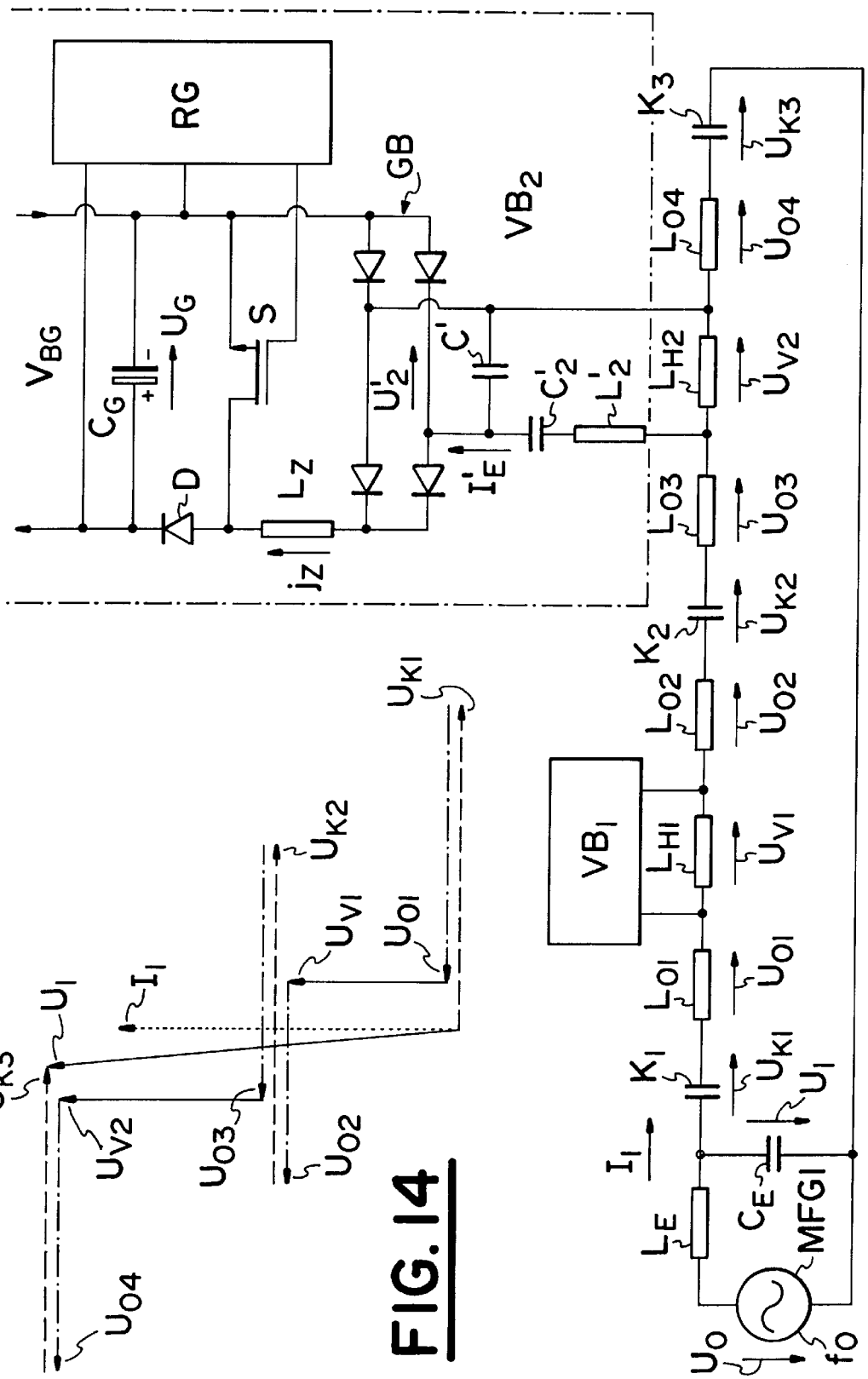
FIG. 13 is an electrical equivalent circuit diagram of the transmitter arrangement according to FIGS. 11 and 12, having an electronic consumer control member.
FIG. 14 is a diagram of the current and voltage indicators of the equivalent circuit diagram of FIG. 13.

In the equivalent circuit diagram of FIG. 13, the capacities and inductances divided in FIG. 12 for reasons of symmetry are respectively combined into a capacity $C_E$ and an inductance $L_E$. The sections of the open coaxial conductor between the compensation capacitors $K_1$ through $K_3$ and the moveable consumers $VB_1$ and $VB_2$ are represented by the inductances $L_{O1}$, $L_{O2}$, $L_{O3}$ and $L_{O4}$ of the corresponding conductor sections in the equivalent circuit diagram of FIG. 13. At the location of the movable consumers $VB_1$ and $VB_2$, the ferrite cores of the transmitter heads form the contactless transmitters having the primary inductances $L_{M1}$ and $L_{M2}$, as shown in FIGS. 7 through 9. The equivalent circuit diagram of the transmitter head having a power control and regulation device is shown for the consumer $VB_2$ to explain the individual control and regulation of the power flux of the individual consumers fed by a common coaxial conductor. The secondary-side scatter inductance $L_2'$ and the magnetization current $I_\mu$ of the transmitter head are compensated by the capacities $C_2'$ and $C'$, corresponding to FIGS. 7 through 9, so that, at the natural frequency $f_0$ of the middle-frequency generator MFG1, the inductance $L_2'$ forms a series resonant circuit with $C_2'$ that is in resonance, and $L_{M2}$ and $C'$ form a parallel resonant circuit that is in resonance.

With this complete compensation of the transmitter head, the current $I_1$ of the coaxial conductor and the base oscillation of the current $I_E'$ at the input of the bridge rectifier in parallel to the capacity $C'$ are identical.

In the DC intermediate circuit, this current flows as a direct current JZ via the inductance LZ and alternatingly via the diode D or the controllable semiconductor switch S. This depends on whether the switch S blocks or conducts. When the switch S is blocked, the current jz is supplied, via the diode D, to a DC-voltage buffer capacitor CG; in contrast, when the switch conducts, the current is guided past the capacitor CG. A regulating device RG controls the switch S alternatingly into the conducting and blocking states at a high clock frequency, with the relative blocking times being set such that the desired voltage $U_G$ is formed at one or a plurality of DC-voltage consumers $V_{BG}$ with an arbitrary current consumption. Because of the imprinting of the currents $I_1$ and $I_E'$, the voltage $U_{V2}$ is established at the primary inductance $L_{H2}$ such that the product $U_{V2} \cdot I_1$ corresponds to the power consumption.

FIG. 14 shows the vector diagram for the equivalent circuit diagram of a total system according to FIG. 13. The partial voltages $U_{O1}$, $U_{O2}$, $U_{O3}$ and $U_{O4}$ at the inductances of the coaxial conductor sections are represented by dot-dash lines, and their angular position leads by 90° with respect to the dotted coaxial conductor current $I_1$. They are extensively compensated by the dashed arrows $U_{K1}$, $U_{K2}$ and $U_{K3}$. At the locations at which a movable consumer is present, the voltages $U_{V1}$ and $U_{V2}$ shown in solid lines and extensively in phase with the coaxial-conductor current $I_1$ result at the primary inductances $L_{H1}$ and $L_{H2}$ of the transmitter heads, corresponding to the transmitted power. Because of the virtually complete compensation of the transmitter head and coaxial conductor inductances, the input voltage $U_1$ of the coaxial conductor is likewise virtually in phase with the coaxial-conductor current, and approximately equal to the sum of the voltages $U_{V1}$ and $U_{V2}$ at the transmitter heads switched electrically in series.

I claim:

1. Arrangement for contactless transmission of electrical power to a movable consumer, having a dormant primary circuit configured as an elongated, parallel arrangement of conductors, the circuit being connected to a high-frequency AC voltage or alternating current source, the arrangement further having a transmitter head that is attached to the movable consumer and comprises a ferrite core and a secondary winding surrounding this ferrite core and magnetically coupled to the primary circuit, wherein the conductor arrangement of the primary circuit has an outside conductor configured as a nearly-closed housing and a center conductor located approximately in the center of the housing, with a current flowing in the outside conductor that is of equal magnitude and directed in the opposite direction of the current flowing in the center conductor, and that the center conductor is surrounded by a U-shaped ferrite core that supports the secondary winding.

2. Arrangement according to claim 1, wherein the U-shaped ferrite core supports on both legs windings located opposite the primary-side conductor and whose height approximately corresponds to the height (H) of the primary conductor and is between 0.3 and 0.5 times the total height ($H_G$) of the U-shaped core.

3. Arrangement according to claim 1 wherein the height (H) of the primary conductor is selected in relation to the passage width ($b_k$) of the magnetic flux adjacent to the conductor region such that maximum power is transmitted.

4. Arrangement according to claim 1 wherein the outside walls of the housing that lie opposite the center conductor are arched to provide the most uniform possible distribution of the current over the widest possible current-guidance region ($b_f$, $b_\gamma$).

5. Arrangement according claim 1 wherein the cross sections of the outside and center conductors and the passage width (b) of the magnetic flux are geometrically shaped, and the size ratios are dimensioned, such that the electrical power loss is minimal.

6. Arrangement according to claim 1 characterized in that the secondary winding is switched in series with a capacitor, which compensates the inductive voltage drop at the scatter inductance of the transmitter head.

7. Arrangement according to claim 1 wherein the length of the path and primary conductor arrangement is greater than 100 m.

8. Arrangement according to claim 1 wherein a plurality of capacitors are switched in series with the center conductor for compensating the inductive voltage drop, and are distributed over the entire length of the center conductor such that the compensation is effected in numerous segments with partial voltages that can be controlled with technology.

9. Arrangement according to claim 1 further comprising a the center web (S) has has near the base a ferritic region of approximately the width ($b_K$) for reducing the magnetic gap width to an absolutely necessary mechanical air gap ($\delta_1$, $\delta_2$).

10. Arrangement according to claim 9, further comprising a capacitor that supplies the magnetization current for generating the magnetic flux density in the air gap of the ferrite core, the capacitor being switched to the secondary winding in parallel to the load resistor.

11. Method of simultaneous, contactless transmission and individually-settable power to a plurality of moved consumers having an arrangement according to claim 1, wherein the transmitter arrangements are fed by a middle-frequency current source with a constant current that is independent of the voltages of the consumers, and electronic control members correspondingly establish the consumer voltages of the transmitted power on the moved consumers.

12. Method according to claim 11, wherein the impression of a constant current into one of the transmitter arrangements is effected by means of a middle-frequency voltage source via a resonance circuit comprising an inductance and a capacity, with the inductance and capacity being dimensioned such that they are in resonance at the frequency fo of the middle-frequency voltage source, and the relationship $$I_1 = U_0 \cdot \sqrt{C_E / L_E}$$

exists between the voltage of the source and the impressed current, and that the transmitter arrangement is connected in parallel to the capacity, which is switched in series with the inductance and the voltage source.

13. Method according to claim 11, wherein the current impressed into the load impedance of a consumer is supplied to an electronic control member that rectifies the current via a bridge rectifier and filters it through a storage inductance, and supplies the direct current formed in this way alternatingly, via a diode, to a capacity charged to a DC voltage at a high clock frequency, or conducts it past the capacity via an electronic switch in its conducting phase, with a regulating device changing the relative blocking phase of a clock period of the electronic switch such that the required DC voltage is supplied to the DC voltage consumers VB connected to the capacity with a fluctuating current consumption.

14. Arrangement according to claim 1 wherein the center conductor is connected, at the end of the path traversed by a movable consumer, to the outside conductor, that is, the housing, and a middle-frequency generator feeds in the current between the center conductor and the housing at the beginning of the path.

15. Arrangement according to claim 1 wherein the primary circuit forms a closed, endless track extending in an arbitrary manner, the track permitting gap-free energy transmission to a plurality of movable consumers, and that, at the connections of the primary circuit, a network conducts the feeder current supplied by the middle-frequency generator into the center conductor and the outside conductor in opposite directions.

16. Arrangement according to claim 15 wherein the network (8) is provided at a plurality of locations on the endless track for balancing the current feed-in.

17. Arrangement according to claim 15, wherein for coupling currents ($I_1$, $I_1'$) of equal magnitude and in opposite directions into the center conductor and the outside conductor of a closed track, the network includes a transformer having two secondary windings whose center ends, which form a voltage center point, are connected to one another by way of the connections of the coaxial outside conductor, and their outside inputs, which are in antiphase, are connected to the center conductor by way of the connections.

18. Arrangement according to claim 17 wherein the supply line pairs respectively connected to the inside and outside conductors of one or both ends of the primary-side conductor arrangement are guided by way of compensation throttles, which effect the uniformity of the currents in the center and outside conductors.

19. Arrangement according to claim 18, wherein the supply lines to the outside-conductor connections are guided to a common connecting point before the guide-through through the compensation throttles on the sides of the compensation throttles facing away from the outside-conductor throttles, with the common connecting point optionally being potential-free, that is, insulated, or connected to the center tap of the middle-frequency source and/or the mass or ground potential.

20. Arrangement according to claim 18 wherein the center conductor comprises a plurality of windings, and the uniformity of the total currents in the center conductor and the current in the outside conductor in that the winding number ratio of the compensation throttles coincides with the winding number of the center conductor.

* * * * *